Patented June 11, 1940

2,204,539

UNITED STATES PATENT OFFICE 2,204,539

PROCESS OF EFFECTING CATION EXCHANGE

Hans Wassenegger, Dessau in Anhalt, and Karl Jaeger, Frankfort-on-the-Main-Hochst, Germany, assignors to I. G. Farbenindustrie Aktiengesellschaft, Frankfort - on - the - Main, Germany No Drawing. Application June 21, 1938, Serial No. 214,934. In Germany February 1, 1936

7 Claims. (Cl. 23—1)

Our present invention relates to a process of effecting cation exchange in aqueous solutions by treating them with artificial resins.

More particularly it relates to the use of compounds which have outstandingly good cation-exchanging properties.

Our invention is based on the discovery that artificial resins of excellent cation-exchanging properties are obtainable if care is taken that the end products contain nuclear sulfonic acid radicles in their molecule. When producing such compounds, we either start from materials which already contain sulfonic acid radicles, such as, for instance, hydroxybenzene-, naphthalene-, acenaphthene- or phenanthrene-sulfonic acids or we after-treat the artificial resins obtained in the normal way with sulfonating agents. In the first case, the said aromatic sulfonic acids should be easily condensed with aldehydes. For subsequent sulfonation of artificial resins free of sulfonic groups, such products are chosen which yield difficultly soluble or insoluble sulfonation products. Especially suitable are granulated artificial resins which have a large interior surface which is maintained, for instance, by carefully drying the jellies resulting after the condensation.

We are aware that resins of formaldehyde, synthetic tanning agents, e. g. condensation products of cresyl sulfonic acid formaldehyde, and polyhydroxybenzenes have already been proposed for cation exchange. But these are mixed condensation products, meanwhile corresponding to the present invention resins are used which are built up by an aldehyde and merely one further component containing nuclear sulfonic groups.

Our base-exchanging bodies when compared with known products of this kind show an increased capacity for cation exchange or more rapid exchange or an easier regeneration, that is to say, they require a smaller excess of reagent for producing the reverse exchange. This regeneration may be carried out by means of suitable acids and salt solutions without injuring the activity.

This application is a continuation-in-part of our application Serial No. 123,150, filed January 30, 1937.

The following examples illustrate the invention without limiting it, the parts being by weight:

Example 1.—175 parts of 1-hydroxybenzene-4-sulfonic acid are heated together with 40 parts of a formaldehyde solution of 30 per cent. strength for ½ hour to about 105° C. Then further 60 parts of formaldehyde are added and the temperature is kept for about 10 hours at 90° C. A hard black resin is formed which is stable to water and of conchoidal fracture. This resin is washed with water and ground to a suitable size of grain. It adsorbs up to 5 per cent. of its own weight of CaO from a solution of calcium chloride. By regeneration with an acid or a solution of common salt this base-exchanging body regains its original absorption capacity.

Example 2.—115 parts of sulfuric acid monohydrate are introduced in the course of 1 hour at 90° C. into 94 parts of hydroxy benzene. Then the mixture is stirred at this temperature until the odor of phenol has disappeared. The mixture is then added to 170 parts of water and caused to react with 150 parts of formaldehyde at about 90 to 100° C. After hardening at 90° C. a dark resin is formed having similar properties as that described in Example 1.

Example 3.—60 parts of naphthalene are heated during 3 hours with 90 parts of sulfuric acid (monohydrate) to 140 to 150° C. After cooling to 75° 90 parts of a formaldehyde solution of 30 per cent. strength are introduced and heating to 90 to 100° C. is continued for 20 hours. The solid gelatinous reaction mass adsorbs after grinding and washing with water per liter about 10 parts of CaO from a spring-water with 25° hardness (German degrees).

Example 4.—110 parts of 1.3-dihydroxybenzene are introduced into 500 parts of sulfuric acid monohydrate, the mixture is slowly heated to 105° C. and kept at this temperature for about 2 hours. Then it is introduced in 250 parts of a formaldehyde solution of 30 per cent. strength. After heating to 100° C. for 15 hours, a rather solid, red, gelatinous resin is obtained which after grinding and washing until free from sulfuric acid, is dried. It is useful for adsorption of cations and may bind from an ammoniacal copper solution containing 0.16 gram of copper per liter, 11 per cent. of copper calculated on its own weight.

Example 5.—100 parts of 1.2-dihydroxybenzene are sulfonated as described in Example 4. The reaction mixture is then introduced while stirring in 200 parts of a formaldehyde solution of 30 per cent. strength. After heating to 100° C. for about 14 hours a black resin is obtained which is ground and washed with water until free from acid. It adsorbs from an ammoniacal copper solution 16 parts of copper per 100 parts of resin. The regeneration preferably is carried out with warm sulfuric acid, whereat the concentration of the sulfuric acid is thus adjusted that after cooling the copper sulfate formed separates in crystals of the pentahydrate.

*Example 6.*—100 parts of phenanthrene are introduced into 120 parts of surfuric acid monohydrate and heated for 8 hours to 100° C. The reaction mixture is then stirred together with 220 parts of a formaldehyde solution of 30 per cent. strength and kept at this temperature for 40 hours. The formed resin is worked up as indicated in Example 5. It may be applied for exchanging cations.

*Example 7.*—50 parts of a resin formed from 1.3-dihydroxybenzene and formaldehyde, are heated together with 750 parts of oleum (containing 65 per cent. of $SO_3$) for 2 hours on the water-bath. The reaction product is separated from the oleum in excess, slowly introduced into water and washed until free from the adhering acid. It is an exchanging body for H-ions and takes up 5 per cent. of its own weight of calcium (calculated as CaO) from the solution of a calcium salt.

*Example 8.*—62 parts of acenaphthene are heated during 4 hours together with 45 parts of sulfuric acid (monohydrate) to 115 to 120°. After adding 60 parts of water and filtering by suction the filtrate is reduced to 94 parts by distillation. This solution of acenaphthene sulfonic acid is mixed with 60 parts of a solution of formaldehyde of 40 per cent. strength and heated to 90 to 100° during 20 hours. The gelatinous reaction mass grows solid and is ground after drying at about 80°. One liter of the product swollen in water adsorbs about 20 parts of CaO from a spring-water of 25° hardness (German degrees), the material being used as a neutral or a hydrogen exchanger.

It is obvious that our invention is not limited to the foregoing examples or to the specific details given therein. Thus, for instance, other aldehydes may be used, such as acetaldehyde or furfur aldehyde. On the other hand, the resin features maintained in carrying out the resin formation may be varied in the known manner, care being only taken that this condensation is performed to such a degree that water-insoluble resins containing sulfonic acid groups are formed.

What we claim is:

1. The process of effecting cation-exchange in aqueous solutions which comprises bringing the solution in contact with a water-insoluble resin of an aldehyde and a member of the group consisting of hydroxybenzene, naphthalene, acenaphthene, and phenanthrene, containing nuclear sulfonic acid groups.

2. The process of effecting cation-exchange in aqueous solutions which comprises bringing the solution in contact with a water-insoluble resin of an aldehyde and naphthalene, containing nuclear sulfonic acid groups.

3. The process of effecting cation-exchange in aqueous solutions which comprises bringing the solution in contact with a water-insoluble resin of formaldehyde and naphthalene, containing nuclear sulfonic acid groups.

4. The process of effecting cation-exchange in aqueous solutions which comprises bringing the solution in contact with a water-insoluble resin of an aldehyde and acenaphthene, containing nuclear sulfonic acid groups.

5. The process of effecting cation-exchange in aqueous solutions which comprises bringing the solution in contact with a water-insoluble resin of formaldehyde and acenaphthene, containing nuclear sulfonic acid groups.

6. The process of effecting cation-exchange in aqueous solutions which comprises bringing the solution in contact with a water-insoluble resin of an aldehyde and phenanthrene, containing nuclear sulfonic acid groups.

7. The process of effecting cation-exchange in aqueous solutions which comprises bringing the solution in contact with a water-insoluble resin of formaldehyde and phenanthrene, containing nuclear sulfonic acid groups.

HANS WASSENEGGER.
KARL JAEGER.